(12) United States Patent
Banerjee et al.

(10) Patent No.: US 7,812,815 B2
(45) Date of Patent: Oct. 12, 2010

(54) COMPACT HAPTIC AND AUGMENTED VIRTUAL REALITY SYSTEM

(75) Inventors: Prashant Banerjee, Westmont, IL (US);
Cristian Luciano, Chicago, IL (US);
Gregory Dawe, Encinitas, CA (US);
Lucian Florea, West Chester, OH (US);
Arnold D. Steinberg, Skokie, IL (US);
James Drummond, Naperville, IL (US);
Milos Zefran, Oak Park, IL (US)

(73) Assignee: The Broad of Trustees of the University of Illinois, Urbana, IL (US)

( * ) Notice: Subject to any disclaimer, the term of this patent is extended or adjusted under 35 U.S.C. 154(b) by 742 days.

(21) Appl. No.: 11/338,434

(22) Filed: Jan. 24, 2006

(65) Prior Publication Data

US 2007/0035511 A1    Feb. 15, 2007

Related U.S. Application Data

(60) Provisional application No. 60/646,837, filed on Jan. 25, 2005, provisional application No. 60/664,214, filed on Mar. 22, 2005.

(51) Int. Cl.
*G09G 5/00* (2006.01)
(52) U.S. Cl. .......................... 345/156; 345/7; 345/633; 715/757
(58) Field of Classification Search ................ 345/633, 345/4–9, 156, 624; 715/757, 701, 702; 600/424
See application file for complete search history.

(56) References Cited

U.S. PATENT DOCUMENTS

| | | | |
|---|---|---|---|
| 5,633,993 A | * | 5/1997 | Redmann et al. ............ 345/419 |
| 5,688,118 A | | 11/1997 | Hayka et al. |
| 5,695,406 A | | 12/1997 | Park |
| 5,973,678 A | | 10/1999 | Stewart et al. |
| 6,111,577 A | | 8/2000 | Zilles et al. |

(Continued)

FOREIGN PATENT DOCUMENTS

EP     1182539 A1     2/2002

(Continued)

OTHER PUBLICATIONS

Viewsonic, "Viewsonic CRT display products brochure", Jun. 9, 2001, (http://web.archive.org/web/20010609121857/www.viewsonic.com/popup/product/viewsonic/proseries.cfm).*

(Continued)

*Primary Examiner*—Amare Mengistu
*Assistant Examiner*—Dmitriy Bolotin
(74) *Attorney, Agent, or Firm*—Greer, Burns & Crain Ltd.

(57) ABSTRACT

The invention provides compact haptic and augmented virtual reality system that produces an augmented reality environment. The system is equipped with software and devices that provide users with stereoscopic visualization and force feedback simultaneously in real time. High resolution, high pixel density, head and hand tracking ability are provided. Well-matched haptics and graphics volumes are realized. Systems of the invention are compact, making use of a standard personal display device, e.g., a computer monitor, as the display driver. Systems of the invention may therefore be inexpensive compared to many conventional virtual reality systems.

20 Claims, 3 Drawing Sheets

U.S. PATENT DOCUMENTS

| | | | |
|---|---|---|---|
| 6,184,868 | B1 | 2/2001 | Shahoian et al. |
| 6,267,599 | B1 | 7/2001 | Bailey |
| 6,334,853 | B1 | 1/2002 | Kopelman et al. |
| 6,361,323 | B1 | 3/2002 | Beach et al. |
| 6,405,158 | B1 | 6/2002 | Massie et al. |
| 6,429,849 | B1 | 8/2002 | An et al. |
| 6,532,299 | B1 | 3/2003 | Sachdeva et al. |
| 6,533,737 | B1 | 3/2003 | Brosseau et al. |
| 6,750,877 | B2 | 6/2004 | Rosenberg et al. |
| 6,786,877 | B2 | 9/2004 | Foxlin |
| 6,863,536 | B1 | 3/2005 | Fisher et al. |
| 6,904,823 | B2 * | 6/2005 | Levin et al. ............ 74/471 XY |
| 6,963,792 | B1 * | 11/2005 | Green ........................ 700/251 |
| 7,324,081 | B2 * | 1/2008 | Friedrich et al. ............ 345/156 |
| 7,376,903 | B2 * | 5/2008 | Morita et al. ............... 715/757 |
| 2002/0005864 | A1 | 1/2002 | Temkin et al. |
| 2002/0119432 | A1 | 8/2002 | Ranta et al. |
| 2002/0180760 | A1 | 12/2002 | Rubbert et al. |
| 2004/0009459 | A1 * | 1/2004 | Anderson et al. ........... 434/262 |
| 2004/0015327 | A1 | 1/2004 | Sachdeva et al. |
| 2004/0091845 | A1 | 5/2004 | Azerad et al. |
| 2004/0125120 | A1 | 7/2004 | Weiner |
| 2007/0279435 | A1 * | 12/2007 | Ng et al. ..................... 345/624 |
| 2007/0279436 | A1 * | 12/2007 | Ng et al. ..................... 345/624 |
| 2008/0143895 | A1 * | 6/2008 | Peterka et al. ................ 349/15 |
| 2008/0297535 | A1 * | 12/2008 | Reinig ........................ 345/633 |

FOREIGN PATENT DOCUMENTS

| | | |
|---|---|---|
| EP | 1452949 A1 | 9/2004 |
| WO | WO 96/28800 | 9/1996 |

OTHER PUBLICATIONS

Ruspini et al. (The Haptic Display of Complex Graphical Environments), 1997, Computer Graphics Proceedings, Anual Conference Series.*

Mulder JD, Jansen J, Van Rhijn A (2003) An affordable optical head tracking system for desktop VR/AR systems. In: Proceedings of the immersive technology and virtual environments workshop 2003, Zurich, Switzerland, May 2003.*

Mulder and van Liere, 2002 Mulder, J.D., van Liere, R., 2002. The personal space station: bringing interaction within reach. In: Richer, S., Taravel, B., (Eds.), Proceedings of the Virtual Reality International Conference, VRIC 2002, p. 73-81.*

Haluck, R., A Prototype Haptic Suturing Simulator, avalible on Jun. 10, 2003; retreaved using www.archive.org, (http://web.archive.org/web/20030610060712/http://cs.millersville.edu/~webster/haptics/suture/index.html).*

J. Mayros, T. Kesavadas, K. Chugh, D. Joshi and D.G. Ellis, Utilization of virtual-reality for endotracheal intubation training. Resuscitation 59 (2003), pp. 133-138.*

A. Johnson, D. Sandin, G. Dawe, T. DeFanti, D. Pape, Z. Qui, S. Thongrong, D. Plepys, "Developing the PARIS: Using the CAVE to Prototype a New VR Display", Symposium on Immersive Projection Technology, Aimes, IA 2000.

Chris Scharver, Ray Evenhouse, Andrew Johnson, Jason Leigh, "Pre-Surgican Cranial Implant Design Using the PARIS™ Prototype," 2004.

AccuTouch® Product Manual, Revision F, 2001.

DentSim™ Virtual Reality Simulator Product Information, Oct. 2004.

TM Immersive Touch brochure, Immersive Touch, Inc., date uncertain downloaded May 2, 2006.

Rachin Technologies, www.reachin.se - date uncertain downloaded May 2, 2006.

SenseGraphics 3D-MIW, www.sensegraphics.se/3dmiw.pdf - date uncertain downloaded on May 2, 2006.

Scharver, Chris, et al., Pre-surgical Cranial Implant Design using the PARIS™ Prototype Thesis, date uncertain believed to be 2004.

CathSim® Vascular Access Simulator - date uncertain downloaded on May 2, 2006.

* cited by examiner

COMPACT HAPTIC AND AUGMENTED VIRTUAL REALITY SYSTEM

PRIORITY CLAIM

This application claims priority to U.S. Provisional Application Ser. Nos. 60/646,837 filed Jan. 25, 2005, and 60/664,214, filed Mar. 22, 2005, pursuant to 35 U.S.C. §119.

FIELD OF THE INVENTION

The field of the invention is virtual reality. The invention concerns a compact, personal virtual reality system with a haptic interface permitting interaction with the virtual environment by a user. Systems of the invention are useful for many purposes, for example, in training, gaming, testing and advertising. The invention accordingly has application in many fields, e.g., medicine (e.g., surgical simulations), advertising and commerce (e.g., product testing and demonstration), education, the design arts, and entertainment (e.g., gaming).

BACKGROUND

The purpose of virtual reality and simulation since its beginnings has been "to create the illusion so well that you feel you are actually doing it." While this goal is still actively being pursued, the past ten years have shown a steady evolution in virtual reality (VR) technologies. VR technology is now being used in many fields. Air traffic control simulations, architectural design, aircraft design, acoustical evaluation (sound proofing and room acoustics), computer aided design, education (virtual science laboratories, cost effective access to sophisticated laboratory environments), entertainment (a wide range of immersive games), legal/police (re-enactment of accidents and crimes), medical applications such as virtual surgery, scientific visualization (aerodynamic simulations, computational fluid dynamics), telepresence and robotics, and flight simulation are among its applications.

Until recently, the one major component lacking in VR simulations has been the sense of touch (haptics). In the pre-haptic systems, a user could reach out and touch a virtual object, but would place his/her hand right through the object, which reduces the reality effect of the environment. Haptics provide force feedback. With force feedback, a user gets the sensation of physical mass in objects presented in the virtual world composed by the computer. Haptic systems are essentially in their infancy, and improvements may still be achieved. The systems can be expensive and may be difficult to produce.

A number of virtual reality systems have been developed previously. The systems generally provide a realistic experience, but have limitations. A number of systems known to the present inventors will be discussed briefly. Example issues in prior systems include, for example, user occlusion of the graphics volume, visual acuity limitations, large mismatch in the size of graphics and haptics volumes, and unwieldy assemblies, Rear-Projection Virtual Reality Systems Rear-projection virtual reality (VR) systems create a virtual environment projecting stereoscopic images on screens located between the users and the projectors. Example rear-projection VR systems include the CAVE®(g and the ImmersaDesk® systems. These displays suffer from occlusion of the image by the user's hand or any interaction device located between the user's eyes and the screens. When a virtual object is located close to the user, the user can place his/her hand "behind" the virtual object. However, the hand will always look "in front" of the virtual object because the image of the virtual object is projected on the screen. This visual paradox confuses the brain and breaks the stereoscopic illusion.

Rear-projection systems displaying stereo images also can create a visually stressful condition known as the accommodation/convergence conflict. The accommodation is the muscle tension needed to change the focal length of the eye lens in order to focus at a particular depth. The convergence is the muscle tension needed to move both eyes to face the focal point. In the real world, when looking at distant objects, the convergence angle between both eyes approaches zero and the accommodation is minimum (the cornea compression muscles are relaxed). When looking at close objects, the convergence angle increases and the accommodation approaches its maximum. The brain coordinates the convergence and the accommodation. However, when looking at stereo computer-generated images, the convergence angle between eyes still varies as the 3D object moves back and forward, but the accommodation always remains the same because the distance from the eyes to the screen is fixed. When the accommodation conflicts with the convergence, the brain gets confused and many users experience headaches.

Augmented Virtual Reality Systems

Augmented reality displays are more suitable for haptics-based applications because, instead of projecting the images onto physical screens, they use half-silvered mirrors to create virtual projection planes. A user's hands, located behind the mirror, are intended to be integrated with the virtual space and therefore provide a natural interaction with the virtual space. A user can still see his/her hands without occluding the virtual objects.

The stereo effect in computer graphics displays is achieved by defining a positive, negative, or zero parallax according to the position of the virtual object with respect to the projection plane. Only when the virtual object is located on the screen (zero parallax) the accommodation/converge conflict is eliminated. Most augmented reality systems do a fair job of minimizing this conflict. Since the projection plane is not physical the user can grab virtual objects with his/her hands nearby, or even exactly at, the virtual projection plane.

However, the conflict can still arise for a number of reasons. If head tracking is not used or fails to accommodate a sufficient range of head tracking, then the conflict arises. In systems with head tracking, if the graphics recalculation is slow then the conflict arises. In systems lacking head tracking, the conflict arises with any user movement. Systems that fail to permit an adequate range of movement tracking can cause the conflict to arise, as well, as can systems that do not properly position a user with respect to the system. The latter problem is especially prevalent in systems requiring a user to stand.

PARIS™

PARIS™ is a projection-based augmented reality system developed by researchers at the University of Illinois at Chicago that uses two mirrors to fold the optics and a translucent black rear-projection screen illuminated by a Christie Mirage 2000 stereo DLP projector. A user stands and looks through an inclined half-silvered mirror that reflects an image projected onto a horizontal screen located above the user's head. A haptics volume is defined below the inclined half-silvered mirror, and a user can reach his/her hands into the haptics volume.

The horizontal screen is positioned outside of an average sized user's field of view, with the intention that only the reflected image on the half-silvered mirror is viewable by the user when the user is looking at the virtual projection plane. Because the half-silvered mirror is translucent, the brightness of the image projected on the horizontal screen is higher than the brightness of the image reflected by the mirror. If the user is positioned such that the image on the horizontal screen enters the field of view, the user can be easily distracted by the horizontal screen.

An issue in haptic augmented reality systems is maintaining collocation of the graphical representation and the haptic feedback of the virtual object. To maintain certain realistic eye-hand coordination, a user has to see and touch the same 3D point in the virtual environment. In the PARIS™ system, collocation is enhanced by a head and hand tracking system handled by a dedicated networked "tracking" computer. Head position and orientation is continuously sent to a separate "rendering" PC over a network to display a viewer-centered perspective. In the PARIS™ system, the tracking PC uses a pcBIRD, from Ascension Technologies Corp. for head and hand tracking.

The PARIS™ system uses a large screen (58"×47"), and provides 120° of horizontal field of view. The wide field of view provides a high degree of immersion. The maximum projector resolution is 1280×1024@108 Hz. With the large screen used in the PARIS™ system, the pixel density (defined as the ratio resolution/size) is 22 pixels per inch (ppi), which is too low to distinguish small details.

Visual acuity is a measurement of a person's vision. Perfect visual acuity is 20/20. Visual acuity for displays can be calculated as 20/(FOV*1200/resolution)(FOV=field of view). In PARIS™, this is 20/(120°*1200/1280 pixels)=20/112.5. Poor visual acuity makes reading text associated with a display very uncomfortable. It can lead to visual fatigue, headaches, dizziness, etc.

The PARIS™ system uses a Sensable Technologies' PHANTOM® Desktop™ haptic device, which presents a haptics workspace volume that approximates a six-inch cube. The graphics workspace volume exceeds the haptics volume considerably. This mismatch of haptics and graphics volume results in only a small portion of the virtual space to be touched with the haptic device. Additionally, with the mismatched volumes only a small number of pixels are used to display the collocated objects.

The PARIS™ system's use of an expensive stereo projector, and its large screen and half-silvered mirror, require use of a cumbersome support assembly. This support assembly and the system as a whole do not lend themselves to ready pre-assembly, shipping, or deployment.

Reachin Display

The Reachin display is a low-cost CRT-based augmented reality system. A small desktop-sized frame holds a CRT above a small half-silvered mirror that is slightly smaller in size than the 17" CRT. The CRT monitor has a resolution of 1280×720@120 Hz. Since the CRT screen is 17 inches diagonal, the pixel density is higher than that of PARIS™: approximately 75 ppi. With a horizontal FOV of 350, the visual acuity is 20/(350*1200/1280)=20/32.81, resulting in a better perception of small details. However, the image reflected on the mirror is horizontally inverted; therefore, the Reachin display cannot be used for application development. To overcome this drawback, it is necessary to use the proprietary Reachin applications programming interface (API) to display properly inverted text on virtual buttons and menus along with the virtual scene.

The Reachin display lacks head tracking. The graphics/haptics collocation is only achieved at a particular sweet spot, and totally broken as soon as the user moves his/her head to the left or right looking at the virtual scene from a different angle. In addition, the image reflected on the mirror gets out of the frame because the mirror is so small. The position of the CRT is also in the field of view of the user, which is very distracting.

2.3 SenseGraphics 3D-MIW

SenseGraphics is a portable auto-stereoscopic augmented reality display ideal for on-the-road demonstrations. A Sharp Actius RD3D laptop is used to display 3D images without requiring the wearing of stereo goggles. It is relatively inexpensive and very compact. The laptop is mounted such that its display is generally parallel to and vertically above a like-sized half-silvered mirror. Like most auto-stereoscopic displays, the resolution in 3D mode is too low for detailed imagery, as each eye sees only 512×768 pixels. The pixel density is less than 58 ppi. With a FOV of 35°, the visual acuity is 20/(35°*1200/512 pixels)=20/82.03. Like the Reachin display, the haptics/graphics collocation is poor because it assumes that a user's perspective is from a single fixed location. The laptop display has its lowest point near the user and is inclined away toward the back of the system. This is effective in making sure that the display of the laptop is outside the view of a user. However, there is a short distance between the laptop display and the mirror. This makes the user's vertical field of view too narrow to be comfortable. Also, as in the Reachin display, the image is inverted, so it is not well-suited for application development. Recently Sensegraphics has introduced 3D-LIW, which has a wider mirror; however the other limitations still exist.

SUMMARY OF THE INVENTION

An embodiment of the invention is a compact haptic and augmented virtual reality system that produces an augmented reality environment. The system is equipped with software and devices that provide users with stereoscopic visualization and force feedback simultaneously in real time. High resolution, high pixel density, head and hand tracking ability are provided. Well-matched haptics and graphics volumes are realized. Systems of the invention are compact, making use of a standard personal display device, e.g., a computer monitor, as the display driver. Systems of the invention may therefore be inexpensive compared to many conventional virtual reality systems.

Visual acuity approaching 20/20 is provided in embodiments of the invention, and displays are non-inverted, permitting use of normal text and graphical data software applications. Collocation is maintained. Well-matched graphics and haptic volumes, a comfortable user position, a large degree of permissible head movement, e.g., approximately one foot, and real-time updating of graphics and haptics environments maintain user comfort. A preferred embodiment compact haptice and augmented virtual reality system provides head tracking, high resolution, high pixel density, and perfectly matching haptics and graphics volumes. A highly realistic virtual environment is provided. User fatigue, dizziness, and headaches are reduced or avoided.

Embodiments of the invention include both desktop devices and devices housed for transport and storage. A preferred embodiment device is completely housed in a portable, rugged cabinet. All components of the device are provided within the cabinet, which, when opened reveals a pre-configured virtual reality environment.

Example embodiments will be discussed, while artisans will appreciate broader aspects of the invention from the detailed description of the example embodiment systems. Artisans will also appreciate that the example embodiment system illustrates inventive methods, software and devices included in the example systems.

DETAILED DESCRIPTION OF THE PREFERRED EMBODIMENTS

Figure 1:
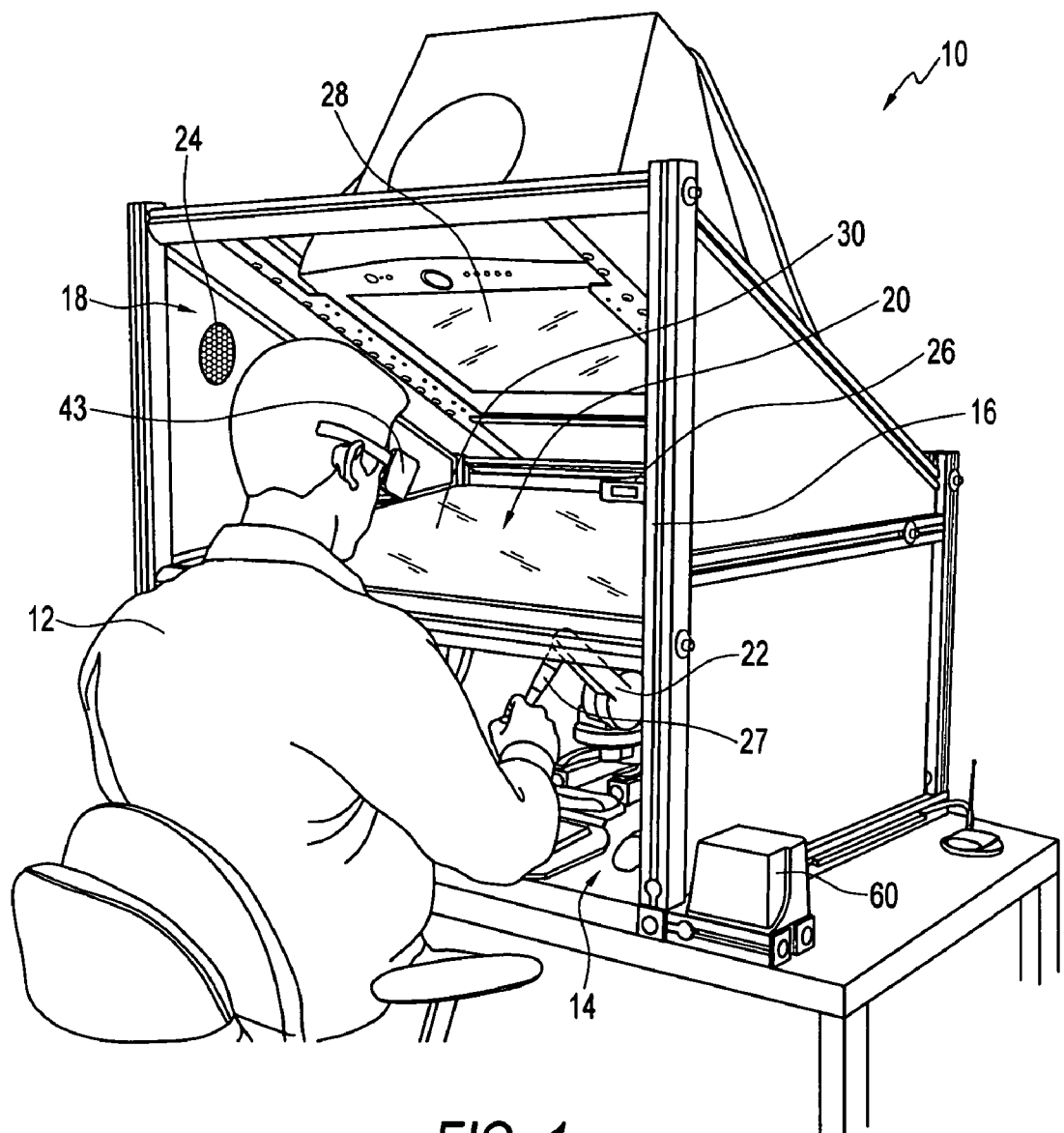
FIG. 1 is perspective schematic view of a preferred embodiment compact haptic and augmented virtual reality system of the invention.

An embodiment of the invention is a compact haptic and augmented virtual reality system that produces an augmented reality environment. The system is equipped with software and devices that provide users with stereoscopic visualization and force feedback simultaneously in real time. High resolution, high pixel density, head and hand tracking ability are provided. Well-matched haptics and graphics volumes are realized.

In an embodiment of the invention, a personal display device and a partially transparent mirror are used to recreate an augmented reality environment. Real time head and hand tracking enhances graphics-haptics collocation and improves immersion and realism. A software library provides a high level layer that encapsulates the rendering of the scene graph. Stereoscopic goggles provide a user visual interface. Hand and head sensors provide information permitting the system to determine a user's movements in a presented virtual environment. A haptic device provides force feedback to the user based upon interactions with the virtual environment. An audio system provides 3-D spatial audio.

Embodiments of the invention provide a number of advantages. Embodiments of the invention provide an interface that includes vision, touch, and hearing simultaneously, and offer real time head and hand tracking, which improves immersion and realism. Embodiments of the invention use a computer monitor rather than a projector, which minimizes cost while also providing for high resolution, e.g. 1600×1200@100 Hz. Embodiments of the invention provide for a wide range for a user's point of view, and incorporate components, for head and hand tracking, tracking and rendering that can run on a personal computer. Example embodiments of the invention also permit haptics and graphics volumes that substantially perfectly or perfectly match. Embodiments of the invention also permit the inclusion of text and menus that can be read normally. The visual acuity, collocation, user positioning and freedom, and other features of devices in accordance with embodiments of the invention provide a comfortable user experience that avoids fatigue and dizziness that can occur in use of other systems. Image data for the graphics environment in preferred embodiment devices can be accepted from an image acquisition system that generates image data for an image volume processing system.

Particular preferred embodiments of the invention will now be discussed with respect to the drawings. Features in the drawings are not to scale, and features may be exaggerated for emphasis. Artisans will understand software and hardware features of the preferred embodiments from included block diagrams. Artisans will also understand broader aspects of the invention from the following description of preferred embodiments.

FIG. 1 shows a preferred embodiment compact haptic and augmented virtual reality system 10 of the invention. A user 12 sits comfortably at a physical desktop workspace 14 defined by a housing 16 that has an opening 18 on one side. Preferably, the physical desktop workspace 14 is disposed at a height that permits the user 12 to sit at the physical desktop workspace 14. In other embodiments, the physical desktop workspace 14 is arranged to permit a user to stand. However, a comfortable sitting position reduces fatigue when using the system 10.

The system 10 includes a multi-sensorial computer interface that includes a stereoscopic vision interface 20, a haptic touch device 22 and a 3-d sound system 24. Additionally, a head tracking device 26 and a hand tracking device 27 provide information regarding the user's interaction with the system as well as the user's visual perspective relating to the system 10. Advantageously, the head tracking device will track a liberal amount of head movement and provide the system with information permitting adjustment of a virtual reality display presented to the user 12 to account for the changed visual perspective of the user.

A graphical environment is provided by a high-resolution display screen 28 positioned by the housing 16 with respect to a partially transparent mirror 30, e.g., a half-silvered mirror. The partially transparent mirror 30 permits the user 12 to see both the virtual reality display and the user's hands, which use the haptic touch device 22 below the mirror. The level of transparency/reflection is not critical. With more reflection, the virtual display is brighter and the hands will appear darker. Thus, for example, 70 percent reflection and 30 percent transmission produce a brighter graphics display and darker hand appearance than a partially transparent mirror that has 60 percent reflection and 40 percent transmission.

In the preferred embodiment, the partially transparent mirror 30 and and the display screen 28 are oriented by the housing 16 to have the user 12 looking directly at the haptic tool, e.g., a stylus, at the origin of the haptic coordinate system. A line between the position of the eyes as determined by the head tracking 26 and the center of the haptic workspace is determined. The virtual projection plane should be located exactly at the center of the haptic workspace and oriented perpendicular to that line. A virtual projection plane angled at 45⁰ with respect to the physical desktop workspace 14 achieves this placing of the virtual projection plane. The plane of the partially transparent mirror 30 corresponds to the bisector of the angle between the display screen 28 and the virtual projection plane. The partially transparent mirror 30 and the display screen are arranged by the housing 16 in the preferred embodiment to position the virtual projection plane at 45⁰ from the physical desktop workspace 14.

The partially transparent mirror 30 should be sufficiently wide to allow the user to view virtual objects from different viewpoints (displaying the correct viewer-centered perspective) while permitting a comfortable range of movement. In a preferred embodiment, a 29"×21" partially transparent mirror used with a 22" high resolution CRT display permit the user 12 up to about one foot of head movement to the left and right without breaking the visual illusion, providing a 2 foot movement range.

In this way, the high resolution display screen 28 and partially transparent mirror 30 are positioned by the housing 16 to create an augmented reality environment that integrates the user's hands with virtual 3d models in the physical desktop workspace 14. In the preferred embodiment, the multi-sensorial computer interface is implemented with single computer 32 (see FIG. 3, not shown in FIG. 1).

The computer 32 makes use of a software library that provides, in real time, a high level layer that encapsulates the rendering of a scene graph on the display screen 28, the stereoscopic vision interface 20, the handling of the head tracking device 26 and the and the hand tracking device 27, an interface with the haptic touch device 22, and playback of 3d spatial audio on the 3-d sound system 24

Figure 2:
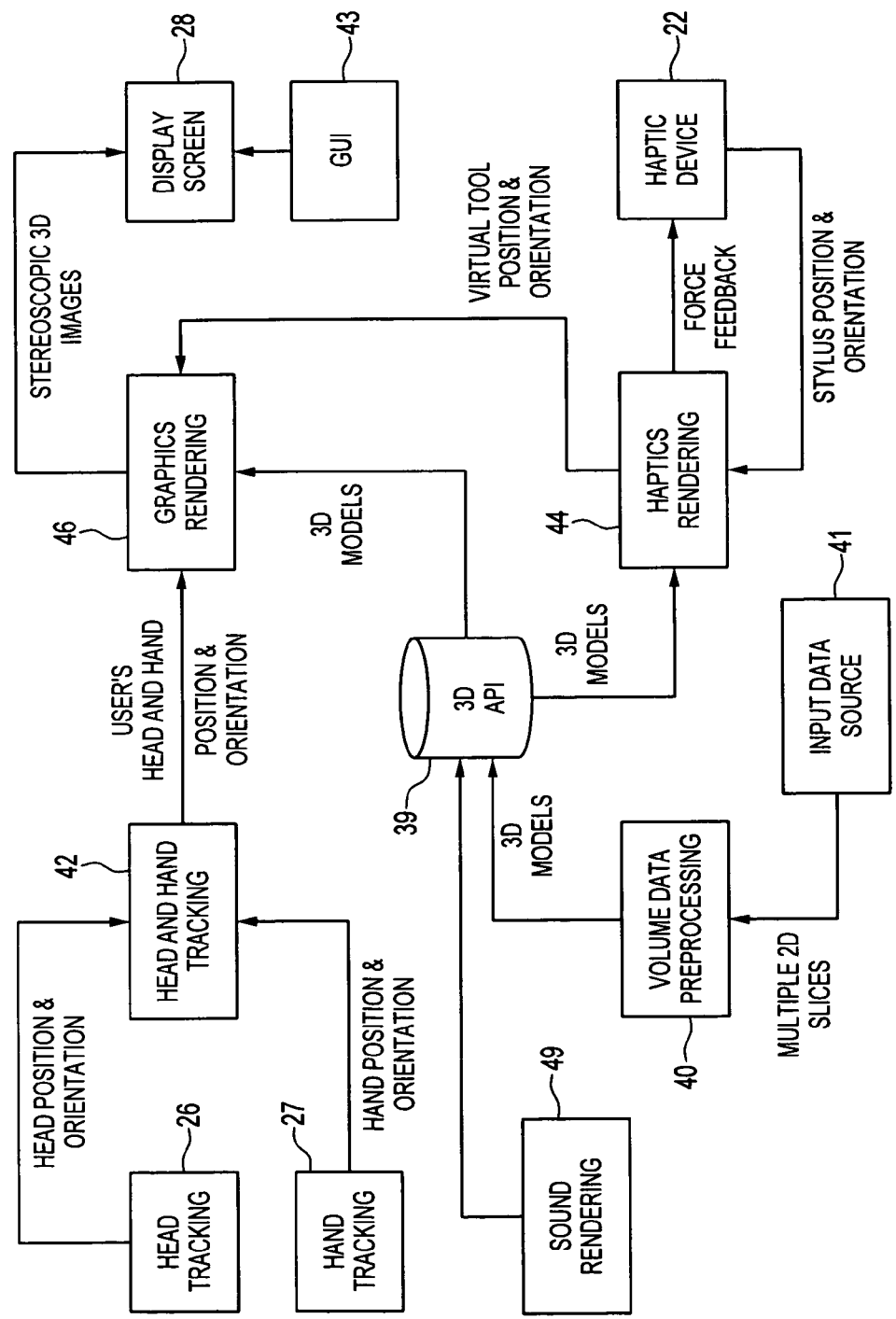
FIG. 2 is block diagram of a preferred software and hardware architecture for a preferred embodiment compact haptic and augmented virtual reality system of the invention.

Referring now to FIG. 2, a software and hardware architecture of a preferred embodiment compact haptic and augmented virtual reality system 10 is shown. The architecture includes interconnected devices and software modules, which are integrated by a 3D application program interface (API) 39.

While systems of the invention can include previously generated graphical data for the presentation of virtual reality graphics on the display screen 28, FIG. 2 includes software and hardware for generating image date from physical models. Specifically, volume data pre-processing 40, takes 2D images during a pre-processing phase from an input data source 41. The volume data pre-processing can receive 2D image data, for example, generated by an input data source 41. The volume data pre-processing 40 provides 3D models to the 3D application program interface 39.

Example input data sources for characterizing physical objects are MRI or CT scanners, typically used for obtaining medical images. The volume data pre-processing 40 segments and combines the 2D images to create a virtual 3D volume of the sample that was scanned, for example a human head. In an example embodiment for medical images that could be used, for example, for surgical training, the volume data pre-processing 40 creates detailed 3D structures. The structures can be layered, as well, not just having an external shape, but having internal structures that can be revealed by operations with the haptic touch device 22, which can be used to make virtual cuts, or drill holes, or the like in an object or objects in the virtual reality environment. For example, in the case of a virtual human head, polygonal isosurfaces corresponding to the skin, bone, brain and ventricles can be extracted from the 3D volume and exported. A file format that permits specification of 3D models is used. In preferred embodiments, the data is extracted and exported as virtual reality modeling language (VRML) files, which has the advantage of being supported by a number of open-source programs. In other embodiments, different file formats permitting specification of 3D models are used, for example. X3D for MPEG-4 data. 3D modeling file formats generally permit specification of polygonal surfaces and also their characteristics, e.g., surface color, image-mapped textures, shininess, transparency, hardness. The characteristics of the various isosurfaces will, with the interface to the haptic device 22, present different feel characteristics in the virtual reality environment, e.g. skin will feel soft and bone hard. A graphical user interface 43 includes, for example, text and menu interface provides for mouse and keyboard driven menus.

VTK 4.5 is standard software can be used, for example, for volume pre-processing 40. The Visualization ToolKit (VTK) is an open source, freely-available, cross-platform C++ library that supports a wide variety of advanced visualization and volume processing algorithms. VTK can be used to read and process volumetric data obtained by Magnetic Resonance Imaging (MRI) or Computer Tomography (CT) scanners, applying a marching cube algorithm to generate isosurfaces from certain sections of the volume with homogeneous density. The isosurfaces generated with VTK are polygonal meshes that can be quickly rendered and manipulated in real time.

Since the monitor image is horizontally flipped, the image reflected on the mirror can be read normally. Therefore, any library can be used create the graphical user interface (GUI) 43. A Fast Light ToolKit (FLTK) is an example preferred library because it is a small and modular freely-available cross-platform C++ GUI that supports 3D graphics via OpenGL® and its built-in GLUT emulation. FLTK is useful for the mouse and keyboard driven menus. With FLTK all of the usual widgets can be used to develop applications (menus, buttons, sliders, etc.). It also has a Fast Light User-Interface Designer (FLUID), which is useful to easily draw the user-interface and to define functions, classes and variables as needed. FLUID creates C++ source and header files that can be included in our application.

Head and hand tracking software 42 interacts with the head tracking device 26 and the hand tracking device 27. In a preferred embodiment, the head tracking device 26 includes a receiver that receives information from an electromagnetic sensor attached to or associated with a user's head, e.g., attached to stereo goggles 43 (see FIG. 1) worn by the user 12. The electromagnetic sensor tracks the user's head to compute the correct viewer's perspective while the user 12 moves his/her head around the virtual display, as a user would naturally do when working with a real object, e.g. a machine part, a human head or hand, etc. Similarly, the hand tracking device 27 can be an electromagnetic sensor attached to the haptic device 22 that cooperates with a transmitter 60. In an example surgical simulation virtual reality display, for example, the hand tracking device can be a SpaceGrip haptic device that tracks a surgeon's hand to define, e.g., a cutting plane and a light source.

In a preferred embodiment, pciBIRD standard software is used for head and hand tracking. pciBIRD, is powered by the PCI bus, which is currently available in most new computers. As preferred embodiments of the invention are implemented on a single computer, it is advantageous to have the tracking devices hooked directly up the computer. This eliminates latency that can be caused by the network communication from a "tracking" PC to a "rendering". In example prototype embodiments of the invention handling complex 3D human head models and virtual surgical tools, a single dual-processor computer was able to handle graphics and haptics rendering, as well as the head and hand tracking.

Haptics rendering software 44 monitors and controls the haptic device 22. The haptics rendering software 44 reads the position and orientation of the haptic device 22, for example a stylus, or a plurality of styluses for different functions or for use by separate hands, and computes collision detections between a virtual device corresponding to the haptic device 22 and objects within the 3D virtual environment. The haptics rendering software 44 also receives 3D models from the 3D application program interface 39. For example, collisions with a virtual device and imported 3D isosurfaces are computed, and the haptics rendering software directs the haptic device 22 to generate the corresponding force feedback. In preferred embodiments, each isosurface is assigned different haptic materials, according to certain parameters: stiffness, viscosity, static friction and dynamic friction. Therefore, the user 12 can feel the different surfaces and textures of objects and surfaces in the virtual environment. In a preferred embodiment surgical simulation, the user 12 can, for example, feel different stiffnesses, viscosity, static friction and dynamic friction of skin, bone, and internal organs, such as the brain. In a preferred embodiment, the graphics and haptics are on two separate pipes, which can be implemented, for example with a dual processor computer. In the preferred embodiment, the haptics and graphics have their own update schedule, for example, haptics at 1000 Hz and graphics at about 30 Hz. In that example, the system would synchronize the two consecutive graphics update after about every 30 haptic updates, and it is within the skill of artisans to modify the manner in which haptics and graphics update and synchronize.

As an example, a certain viscosity effect is felt through the haptic device 22 as a corresponding virtual catheter passes through the gelatinous parenchyma of the brain. As soon as the virtual catheter breaks the dense ependymal ventricular lining, the viscosity effect ceases, providing the user 12 conducing a surgical simulation with the distinct "popping or puncturing" sensation.

Example preferred software for the haptics rendering software is GHOST 4.0 standard software and an example preferred haptic devise is the PHANTOM® haptic device. The General Haptic Open Software Toolkit (GHOST) is a cross-platform library commercialized by SensAble Technologies. VRML is necessary to transfer 3D models from VTK to the haptic library and Coin. GHOST aids interactions with a PHANTOM® haptic device and to compute the collision detection. GHOST permits defining different haptic materials to each 3D object in a virtual scene specifying four coefficients: stiffness, viscosity, static and dynamic frictions. Once a collision between the tip of a virtual tool held by the user 12 and any virtual object is detected, GHOST computes the reaction and supplies forces the haptic device to give the user the illusion of touching the object. Both Coin and GHOST are synchronized with the head tracking system so the user can see and touch exactly at the same 3D point, no matter from which viewpoint he/she is looking.

Another issue to be considered is the location of the transmitter of the electromagnetic tracking system. pciBIRD, used in example preferred embodiments, lacks a mechanism to synchronize I/O reading with the monitor refresh rate (unlike pcBIRD, miniBIRD, nest of Bird, and Flock of Birds). If the transmitter is located close to the display screen 28, it can incorporates magnetic noise to the display screen 28. On the other hand, if the transmitter is located far away from the receivers, then the accuracy of the tracking system decreases while its jitter increases. The pciBIRD is Windows and Plug & Play compatible. It provides positions and orientations of the user's head and hand. In the example embodiment system, it assists in provided perfect or substantially perfect graphics/haptics collocation; to provide a more natural interaction with the 3D virtual models. In order to minimize the noise caused by the CRT, the measurement rate is set to 85 Hz, which is different from the monitor horizontal refresh rate (100 Hz).

Hand tracking is very useful because it allows users to use both hands to interact with the virtual scene. While the user 12 can feel tactile sensations with a hand holding a haptic stylus, it is also possible to use a tracked hand to move the 3D objects, manipulate lights, or define planes in the same 3D working volume. In an example embodiment, for hand tracking, the SpaceGrips® that holds a pciBIRD receiver is used, and provides access to 4 buttons through a serial port. FIG. 1 shows the optimal location for a transmitter 60 (at one side of the device housing 16), which affords sufficient tracking display screen 28.

Graphics rendering software 46 receives 3D models from the 3D application program interface 39. The graphics rendering software further receives hand and head position and orientation information from the head and hand tracking software 42. Also, the graphics rendering software 46 receives virtual tool(s) information from the haptics rendering software 44. With the models and other information, the graphics rendering software 46 software generates and continuously updates, in real time, the stereoscopic 3D display that is displayed by the display screen 28.

In example embodiment, the graphics rendering software 46 is Coin 2.3 standard software. Coin is an open source high-level 3D graphics library that uses scene-graph data structures to render real-time graphics. It is an Open Inventor implementation, ideal to develop scientific and engineering visualization applications. Coin is free under the GPL for Free Software development, and requires an annual fee per developer for commercial use. VTK also has graphics rendering capabilities. However, Coin is optimized for real-time polygonal rendering and provides more sophisticated interaction nodes. Therefore, in preferred embodiments a separate graphics rendering, such as coin is used for rendering the isosurfaces generated with the visualization tool kit VTK (the volume data pre-processing 40). However, in other embodiments, the 3D API also handles the rendering and separate graphics rendering software is not required.

The API 39 provides a camera node that computes the correct viewer-centered perspective projection on the virtual projection plane. It properly renders both left and right views according to the position and orientation of the user's head given by the tracking system.

An example embodiment, as has been mentioned, is a surgical simulation. In the example embodiment, the virtual 3D environment is organized as an Open Inventor scene graph that includes the imported 3D isosurfaces, a light source controlled by the haptic device 22 (with reference to hand tracking 27), a cutting plane manipulator also controlled by the haptic device 22 (with reference to hand tracking 27, and a perspective camera node controlled by the head tracking 26. The camera node displays both perspectives of the user's eyes according to the position and orientation of his/her head. The scene graph is traversed and displayed using a frame sequential (active) stereo technique on the high resolution display screen 28.

The display screen 28 in a preferred embodiment is a high display resolution (1600×1200 pixels) 22" CRT display that provides high visual acuity (20/24.74), which is important to clearly see, e.g., the markings of a virtual tool and small details of the a virtual object. The 22" CRT has a size of 16"×12", and the pixel density is 100 ppi. The horizontal FOV is 33°. Therefore, the visual acuity is 20/(33°*1200/1600 pixels)=20/24.75, which is close to the perfect vision. A refresh rate of 100 Hz diminishes the annoying flicker caused by the active stereo goggles, minimizing the strain on the eyes.

The display screen 28 is set up to automatically produce a display that includes properly oriented text when shown by the image reflected on the partially transparent mirror. One option is to use a hardware video converter between the graphics card and the display screen 28 to mirror the image. The video converter must support the resolution of the display screen. A preferred simple way to flip the image is to reverse the wires of the horizontal deflector yoke of a CRT monitor. With the display screen 28 being set up for automatically flip the image, to produce a correct reflected display, any standard models and graphics rendering applications can be used. In other embodiments, the display screen 28 is a flat screen monitor, e.g., an LCD monitor. In such a case, the automatic horizontal flipping can be accomplished, for example, by an external firmware, software, or hardware module to the monitor.

Sound rendering 49 is also used in preferred embodiments to add auditory simulations to the virtual environment. Example preferred sound rendering software is Open Audio Library (OpenAL), is a freely-available cross-platform 3D audio API that serves as a software interface to audio hardware. OpenAL is can generate arrangements of sound sources around a listener in a virtual 3D environment. It handles sound-source directivity and distance-related attenuation and Doppler effects, as well as special effects such as reflection, obstruction, transmission, and reverberation. The OpenAL works fine with a pair of regular loudspeakers, however, the partially transparent mirror 30 presents a barrier for certain high frequency sounds. A more realistic sound experience can be obtained by having the user 12 wearing headphones. Because the user's head position and orientation are monitored, listener-centered 3D audio can be rendered in a similar to the rendering of stereoscopic viewer-centered perspective projection. This provides a comprehensive graphics/haptics/audio collocation.

A system of the invention can be calibrated. Since the projection plane is virtual, a physical measurement is very cumbersome to perform. The head tracking 26 and hand tracking 27 can both be used for calibration, or either one may be calibrated separately. A tracking sensor (receiver) is held at the projection plane until it is superimposed with a point displayed at the center of the projection plane. Then, this position is given by the tracking system. The measurement of the offset from the center of the haptic workspace to the transmitter can be done interactively moving the haptic device and leaving the graphics rendering fixed until the haptic stylus coincides with the virtual probe. This can be done only at the center of the projection plane. For a better calibration, this can be repeated at a plurality of points in the haptic workspace to create a correction table. Interocular distance, offset from the head sensor to the center of the head, as well as the offset from the hand sensor to the center of the haptic device 22 can be specified manually through the graphical user interface.

Figure 3:
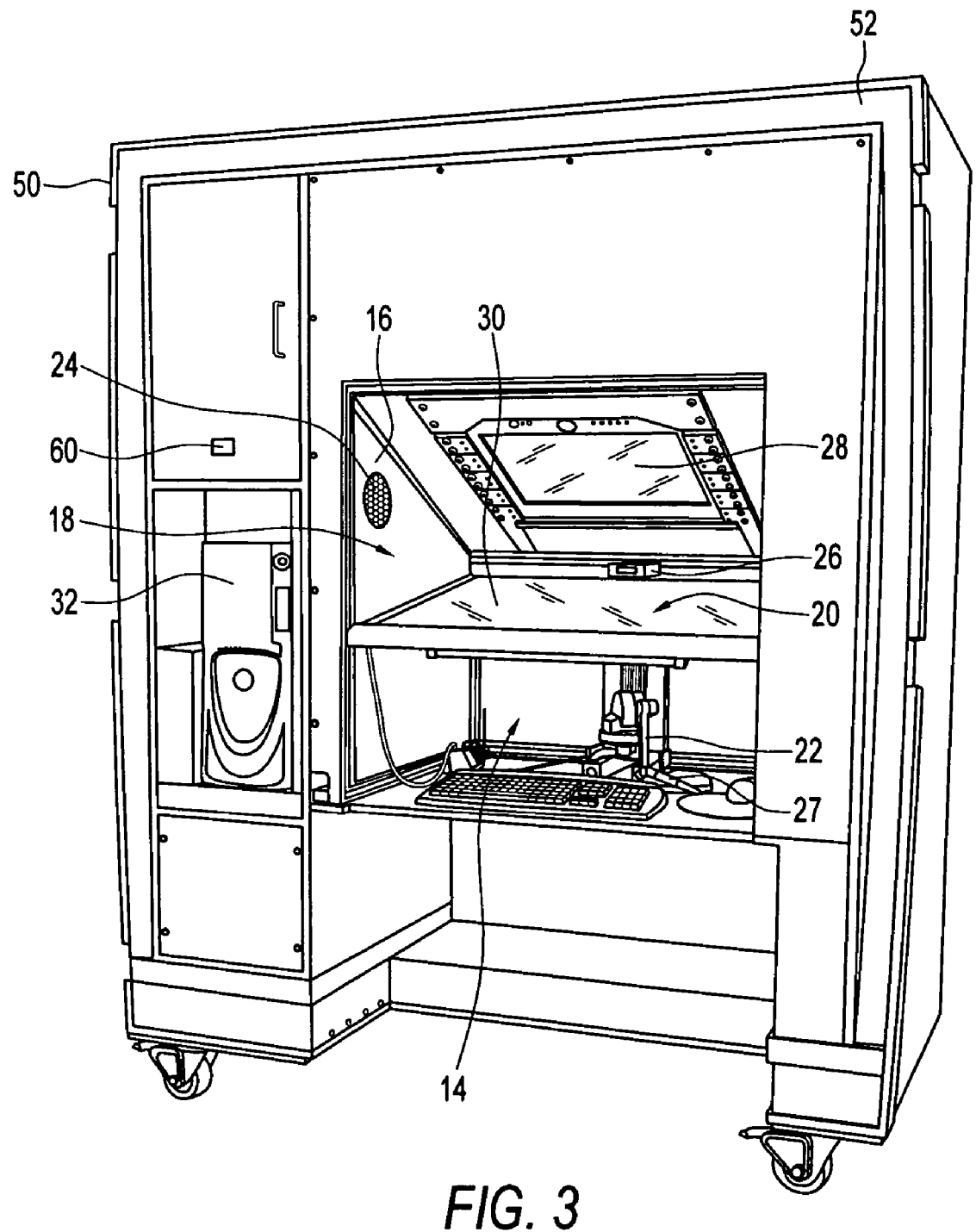
FIG. 3 is perspective schematic view of another preferred embodiment compact haptic and augmented virtual reality system of the invention.

Another embodiment is shown in FIG. 3. The FIG. 3 embodiment is similar to the FIG. 1 embodiment, but the virtual reality system is completely housed in a portable, rugged cabinet 50. The cabinet 50 includes padding 52, and the physical desktop workspace 14 is fixedly mounted within the cabinet to place all system components in their operational position. The cabinet 50 can be sealed and closed with a cover, permitting ready transport of the system, and also permitting the system to be pre-assembled for shipping.

Systems of the invention can be used with many 3D models, and new models can be easily created for use in the system. Applications include those already mentioned. Additional examples include, mechanical procedures, manufacturing training, and many others. Example 3D models that have been used with a prototype device of the invention to conduct surgical and dental simulations are a "Haptic Visible Human", which helps Medicine students to learn human anatomy "touching" a Human Visible Project® dataset, Artisans will recognize limitless applications and simulations that can be readily conducted with devices of the invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A compact haptic and augmented virtual reality system, the system comprising:

a physical desktop workspace arranged by a housing that is open on one side, the physical desktop workspace being configured for comfortably positioning a user's head and hands with respect to the system;

head and hand tracking devices to track head and hand movements of a user;

a high-resolution display screen positioned by the housing above a position of the user's head and facing a partially transparent mirror, the partially transparent mirror being positioned by the housing below the position of the user's head;

a haptic touch device positioned below the partially transparent mirror in a position to permit the user to see both the virtual reality display and the user's hands when the user's hands are placed below the mirror to use the haptic touch device and the user's head is positioned above the mirror to view an augmented reality environment that integrates the user's hands with virtual 3d models in the physical desktop workspace; and a software library that provides, in real time, a high level layer that encapsulates the rendering of a scene graph on the display screen, the stereoscopic vision interface, the handling of the hand and head tracking devices, and an interface with the haptic touch interface.

2. The system of claim 1, wherein further comprises a 3-d hearing interface for a user; and said software library further comprises software for rendering playback of 3d spatial audio on the 3-d hearing interface.

3. The system of claim 1, wherein said high-resolution display screen automatically flips images so that text and data are correctly oriented in the augmented reality environment generated with the partially transparent mirror.

4. The system of claim 1, wherein said partially transparent mirror and said display screen are sized and arranged to permit a user to move his/her head relative to the partially transparent mirror and maintaining said augmented reality environment, said software library updating, in real-time, the scene graph on the high resolution display screen to accommodate head movement sensed by said head tracking.

5. The system of claim 1, wherein said partially transparent mirror and said display screen are positioned by the housing to create a virtual projection plane disposed at 45° with respect to said physical desktop workspace.

6. The system of claim 5, wherein the plane of the partially transparent mirror corresponds to the bisector of the angle between the display screen and the virtual projection plane.

7. The system of claim 1, wherein said software library updates, in real-time, the scene graph on the high resolution display screen to accommodate head movement sensed by said head tracking to maintain substantially perfect graphics and haptics collocation.

8. The system of claim 1, wherein the software library is implemented on a single computer.

9. The system of claim 1, wherein said head tracking comprises position and orientation sensing.

10. The system of claim 9, wherein said software library renders left and right views on said display screen centered according to the position and orientation of a user's head as determined by said head tracking.

11. The system of claim 10, wherein said hand tracking comprises position and orientation sensing.

12. The system of claim 1, wherein said display screen and said partially transparent mirror are configured to provide near perfect visual acuity.

13. The system of claim 12, wherein the visual acuity is approximately 20/25.

14. The system of claim 1, wherein said head tracking and said hand tracking are measured at a frequency rate that is different than the frequency rate of said display screen.

15. The system of claim 1, wherein said high resolution display screen and said partially transparent mirror collocate and substantially perfectly match a virtual reality display volume and a haptic workspace to form the augmented reality environment.

16. The system of claim 15, wherein the software library provides calibration for matching of the haptic workspace and the virtual reality display volume.

17. The system of claim 1, wherein the software library provides 3-d modeling file formats permitting specification of polygonal surfaces and visual appearance and haptic material thereof.

18. The system of claim 17, wherein the visual appearance specifications permitted by the 3D modeling file format includes texture, color, shininess and transparency and the haptic material specifications include stiffness, viscosity, static friction, and dynamic friction.

19. The system of claim 1, wherein the partially transparent mirror, high resolution display screen and haptic touch device are oriented by the housing to have the user looking directly at the haptic touch device at the origin of a haptic coordinate system so that a line between the position of eyes of the user as determined by the head tracking device and the center of the haptic workspace is determined, and so that a virtual projection plane is located at the center of the haptic workspace and oriented perpendicular to that line.

20. The system of claim 1, wherein the head and hand tracking devices comprise an electromagnetic tracking system including head and hand receivers that cooperate with a transmitter located at a front side of the physical desktop workspace, the transmitter having a measurement rate that is different from a refresh rate of the high-resolution display screen.

* * * * *

UNITED STATES PATENT AND TRADEMARK OFFICE
CERTIFICATE OF CORRECTION

| | |
|---|---|
| PATENT NO. | : 7,812,815 B2 |
| APPLICATION NO. | : 11/338434 |
| DATED | : October 12, 2010 |
| INVENTOR(S) | : Banerjee et al. |

It is certified that error appears in the above-identified patent and that said Letters Patent is hereby corrected as shown below:

On the Title Page

In the "Other Publications" item (56),

| | |
|---|---|
| Page 2, right column, line 28 | Please delete "Rachin Technologies" and insert --Reachin Technologies-- in its place. |
| Page 2, right column, line 34 | After "Simulator", please insert --User Manual--. |

In the Specification:

| | |
|---|---|
| Col. 1, line 64 | Please delete "CAVE®(g" and insert --CAVE®-- in its place. |
| Col. 3, line 56 | Please delete "350" and insert --35°-- in its place. |
| Col. 3, line 57 | Please delete "350" and insert --35°-- in its place. |
| Col. 4, line 53 | Please delete "haptice" and insert --haptic-- in its place. |
| Col. 6, line 44 | Please delete "450" and insert --45°-- in its place. |
| Col. 6, line 50 | Please delete "450" and insert --45°-- in its place. |
| Col. 7, line 5 | Please delete "and the and the" and insert --and the-- in its place. |
| Col. 7, line 7 | After "24", please insert a --.--. |
| Col. 7, line 46 | Please delete "example." and insert --example,-- in its place. |
| Col. 7, line 56 | After "standard software", please insert --that--. |
| Col. 8, line 3 | Please insert --to-- before "create". |
| Col. 9, line 16 | Please delete "devise" and insert --device-- in its place. |
| Col. 9, line 27 | After "supplies forces", please insert --to--. |
| Col. 9, line 38 | Please delete "incorporates" and insert --incorporate-- in its place. |
| Col. 9, line 44 | Please delete "provided" and insert --providing-- in its place. |
| Col. 10, line 29 | Before "the cutting plane", please delete --a--. |
| Col. 10, line 30 | Please delete "hand tracking 27," and insert --hand tracking 27),-- in its place. |
| Col. 10, line 56 | Please delete "automatically flip" and insert --automatically flipping-- in its place. |
| Col. 11, line 2 | Please delete "Open AL is can" and insert --Open AL can-- in its place. |

Signed and Sealed this
Twelfth Day of April, 2011

David J. Kappos
*Director of the United States Patent and Trademark Office*